United States Patent Office 3,433,901
Patented Mar. 18, 1969

3,433,901
APPARATUS FOR CONTROLLING THE ESTABLISHMENT OF CALL CONNECTIONS IN A DISTRIBUTED LINE CONCENTRATOR SYSTEM
Harry Reinig, Piscataway Township, Middlesex County, N.J., assignor to Bell Telephone Laboratories, Incorporated, New York, N.Y., a corporation of New York
Filed Sept. 27, 1965, Ser. No. 490,405
U.S. Cl. 179—18     12 Claims
Int. Cl. H04m 3/00, 3/56

ABSTRACT OF THE DISCLOSURE

Distributed remote line concentrator equipment proximate to individual remote substation lines is disclosed for interconnecting the lines over a lesser plurality of trunks with a central office. The equipment further provides for connecting party line substations together without the necessity of establishing such connections over the trunks to the central office. Circuitry is also included at the central office for comparing signals returned from the remote equipment with signals transmitted to the equipment for determining the condition of a called line prior to establishing call connections.

This invention relates to telephone line concentrator systems and more particularly to distributed line concentrator systems in which individual concentrator units are disposed proximate to the respective customer premises.

As is well known, line concentrators are useful in reducing the cost of outside plant by arranging for the common usage of a relatively smaller number of trunks extending to a central office by a larger number of substation lines. The savings are derived in part from the lack of necessity to extend each substation line individually to the office as in conventional practice.

Although completely operative and useful, the application of line concentrators has been largely restricted to urban areas or locations in which a relatively high substation line density exists in a limited area. Since each line must, in a concentrator arrangement, be extended over an individual path to the remote concentrator, it is apparent that significant distances between each line and the concentrator unit may entail lengths of substation lines which might approach those used if the lines were directly connected to the office. This difficulty is shown in sharpest relief in the case of a "back-haul" where a substation line must be extended in a direction away from the central office to reach the remote concentrator switching unit.

As a result, an entire class of subscribers, namely rural subscribers, have in some instances not been provided with concentrator facilities since the long distances between the rural customers and between the customers and the office have made the use of conventional line concentrators economically prohibitive. Instead, in a considerable number of instances, rural customers are provided with party line service in which eight or more parties share a single line to the office. The degradation of service availability and privacy on a heavily loaded party line needs no elucidation.

It is therefore an object of this invention to provide for the concentration of rural substation lines which are remotely disposed from each other and from the central office.

A further object of this invention is to provide for the sharing of a relatively smaller number of trunks by a larger number of lines wherein each line may be individually connected to each trunk.

Still another object of this invention is to provide for the seizure of an idle trunk by equipment at the concentrator unit individual to the calling substation line.

It is also well known that intraconcentrator calling among rural customers and in particular revertive calls between customers on a party line may constitute a significant portion of the traffic on rural systems.

In certain prior art systems a revertive call between customers connected to the same party line or customers connected to the same concentrator may pre-empt the use of one or more concentrator trunks extending to the office to serve the call. This procedure is disadvantageous since the number of trunks which would presumably be used in a rural concentrator are relatively small in view of the long distance between the customers and the office. In consequence, in an illustrative five trunk group the use of one or two trunks to service a revertive call precludes the availability of twenty to forty percent of the trunks between remaining customers.

It is therefore another object of this invention to provide for the extension of revertive calls between customers on a party line coupled to a concentrator without the utilization of any concentrator trunks after the call has been established and the called party rung.

In view of the limited control facilities disposed at a remote concentrator unit, it is on occasion difficult to distinguish between a signal received from a substation which is acknowledging a signal from the office as distinguished from a signal which may be transmitted from a station which is initiating a call.

Thus in trying to establish a terminating call to a substation and while awaiting a signal response from the called substation, it is conceivable that a signal may be delivered by a station which is making a wholly unrelated service request call during the time period that the control equipment at the office is waiting for the called station's signal.

It is therefore another object of this invention to distinguish between signals from calling and called stations received at the office.

These and other objects and features of the invention are achieved in a specific illustrative embodiment in which a concentrator system of the "distributed" type is utilized. The trunks are arranged in a group of, for example, five or eleven trunks. One trunk pair is used for data and control signaling and the remaining trunks are used for voice transmission. Individual concentrators are disposed along the trunk route at a location as close to the substation line to be connected to the trunks as is convenient. Thus, if the trunks are included in a cable suspended from poles along a road and if a substation is one-half mile off the road, the concentrator unit will be located at the pole closest to the substation line extending to the customer to be served. Each concentrator unit includes facilities for coupling the line to each of the trunks. These facilities include local scanning units at each concentrator which examine the busy or idle condition of the available trunks. Moreover, each customer is identified by a unique multifrequency tone code on both originating and terminating calls.

Additional economy and flexibility are gained by connecting two party lines to the concentrator. In this respect it will be noted that the service to the two party line cusomers is significantly upgraded from the eight or more party line service available to the customer theretofore. Moreover, in the event of a revertive call between two customers connected to the same party line, the conversation connection once established may be continued without the use of any voice trunks or supervision from the office.

These and other objects and features of the invention may be more readily comprehended from an examination of the following specification, appended claims and attached drawing in which:

General description

Figure 1:
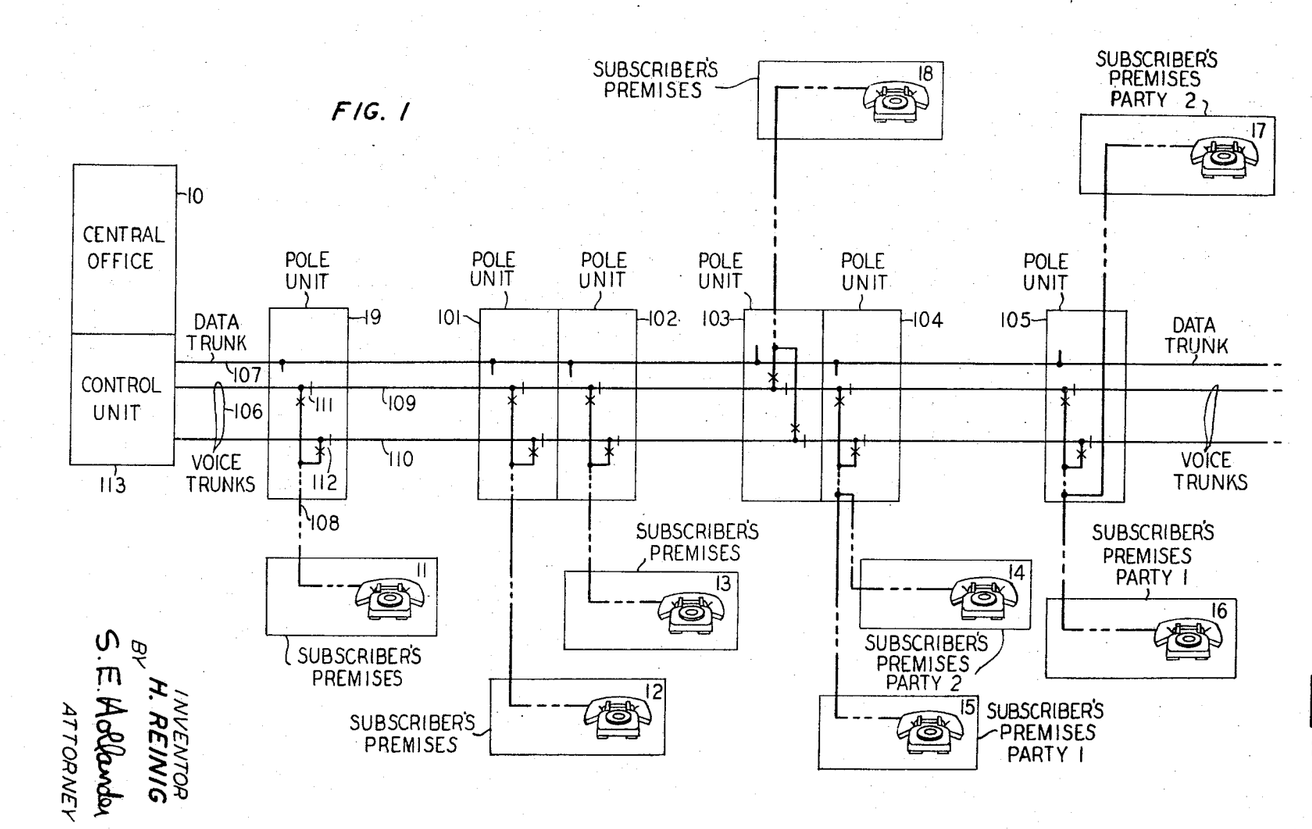
FIG. 1 is a block diagram showing the distributed pole unit concentrators and customer substations.

As shown in FIG. 1 the central office 10 is connectable to the customer substations 11, 12, etc. by means of the distributed concentrator units 19, 101, 102, etc. The concentrator is "distributed" in the sense that the remote units include a plurality of distinct elements proximate to the location of the subscriber premises. The voice trunks 106 and data trunk 107 may illustratively be included in a multitrunk cable which extends along a road or highway in the general vicinity of the customer stations to be served. For example, pole unit 19 is a unit mounted on a telephone pole which also supports the multitrunk cable including trunks 106 and 107. Extending from the pole unit is a single pair of wires 108 which lead to the customer premises. Since the latter premises 11 may be a substantial distance from the pole unit 19 (e.g. one-half mile), additional poles may be interposed between pole unit 19 and the customer premises 11 to support the wire pair 108. At the pole unit 19 the wire pair 108 is connectable to any idle voice trunk; for example, trunks 109 or 110 over the respective contacts 111, 112. Although only two voice trunks are shown, it is understood that a larger number may be utilized and although single crosspoints 111 and 112 are shown, it is understood that a pair of crosspoints will be utilized for each trunk (tip and ring conductor).

The data trunk 107 is utilized for the transmission of control signals between the pole units and the control unit 113. As indicated herein direct current signaling is used on the voice trunks with the tip conductor utilized by the central office to signal the remote units and the ring conductor being used to signal the central office by the remote units.

Pole units 101 and 102 which are mounted for convenience on the same pole provide private line service to substations 12 and 13, respectively. Pole units 103 and 104 are also mounted on the same pole for convenience but unit 103 provides private line service to substation 18 while unit 104 provides party line service to stations 14 and 15. Moreover, pole unit 105 provides party line service to stations 16 and 17.

As shown herein in detail, power to operate the pole units is obtained at the customer premises and transmitted to the units over the customer wire pair. On a two party connection one party has the power supply which serves both parties as well as the pole unit. The negative battery potentials at the substations and remote unit, shown separately for convenience are all derived from the local power supply. Each substation is identified by a two-out-of-twelve MF code and has access to the trunks 106 by a motor driven selector switch which seizes an idle trunk on originating and terminating calls. For two-party service a revertive call is initiated using a voice trunk; but once the called party answers, the conversation may be carried on locally after the voice trunk is released.

General description of operation— Private line originating call

Figure 2:
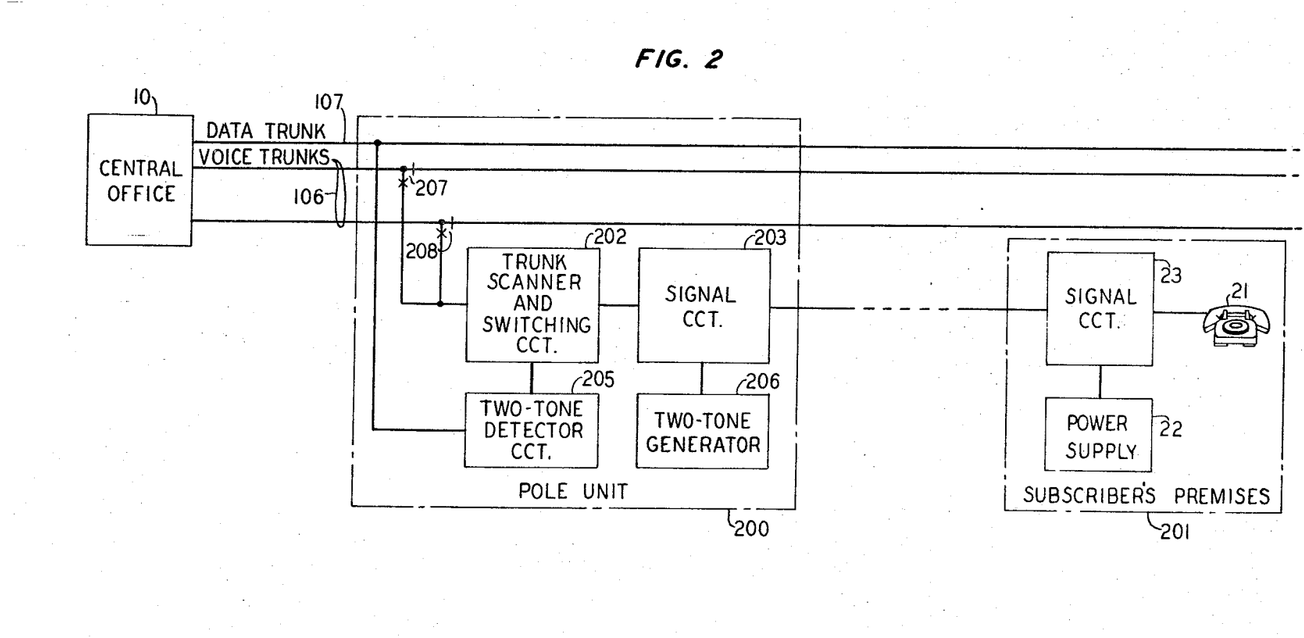
FIG. 2 is an outline diagram showing in general form a typical pole unit and the equipment at the customer's location.

Referring now to FIG. 2, a pole unit 200 similar to that shown as box 19 in FIG. 1 and a substation unit 201 located at the subscriber's premises and similar to that shown as box 11 in FIG. 1 are connectable over voice trunks 106 to the central office 10. A trunk scanner and switching circuit 202 shown in detail in FIG. 6, as well as a signal circuit 203, are included within the pole unit. Moreover, a two-tone generator 206 and two-tone detector 205 are also included within the pole unit 200. At the subscriber's premises 201 the substation 21 is equipped with a local power supply 22 and a circuit 23 for connecting the substation 21 to the pole unit 200.

When substation 21 goes off-hook the signal circuit 23 forwards a signal to the pole unit 200 via signal circuit 203. The trunk scanner 202 is energized and seizes the first idle trunk. A signal condition is applied to the ring conductor of the selected trunk and generator 206 delivers multifrequency signals indicative of the substation identity over the selected trunk to the central office. Equipment at the office detects the service request and identifies the calling substation. Thereupon the office applies a signal to the tip conductor of the selected trunk to indicate that the substation has been identified. Dial tone is thereafter applied to the selected trunk and the calling customer dials the directory number of the called substation. Subsequently, the call is extended in a routine manner.

When the conversation is completed, the disconnect signal from either substation is received at the office which thereupon disconnects the calling substation from the trunk at the pole unit 200 by releasing the contacts 207, 208, etc. of the selected trunk.

General description of operation— Private line terminating call

The central office identifies the customer to be called and transmits the coded signals unique to the called customer on data trunk 107. The encoding of the called substation identity may be similar to that described in Patent 3,070,666 of C. E. Brooks et al. of Dec. 25, 1962 and Patent 2,820,103 of H. H. Abbott of Jan. 14, 1958. At the appropriate pole unit (only one of which is shown in FIG. 2) the tones are detected and the scanner circuit is energized to again search for and seize an idle trunk. When a trunk has been seized by scanner 202 a signal is again applied to the ring conductor of the selected trunk and the generator 206 returns the identity of the substation individual to pole unit 200 to the office. The central office detects the signal on the ring conductor and identifies the substation. Thereupon, the signals received from generator 206 are compared with those which are being transmitted from the office over the data trunk, also indicative of the called substation identification. If a match check is effected, the central office applies a signal over the tip conductor of the selected trunk indicating reception of the signal from the pole unit 200 and ringing is applied to the selected trunk in a conventional manner.

If a mismatch had occurred when comparing the two signals, it would be assumed that a new service request is being made and the new call would be treated in the manner described above for an originating call.

When the called customer responds to the ringing signal delivered after the successful match check indication, ringing is tripped in a conventional manner and the disconnect indication is treated in the manner referred to above.

Figure 3:
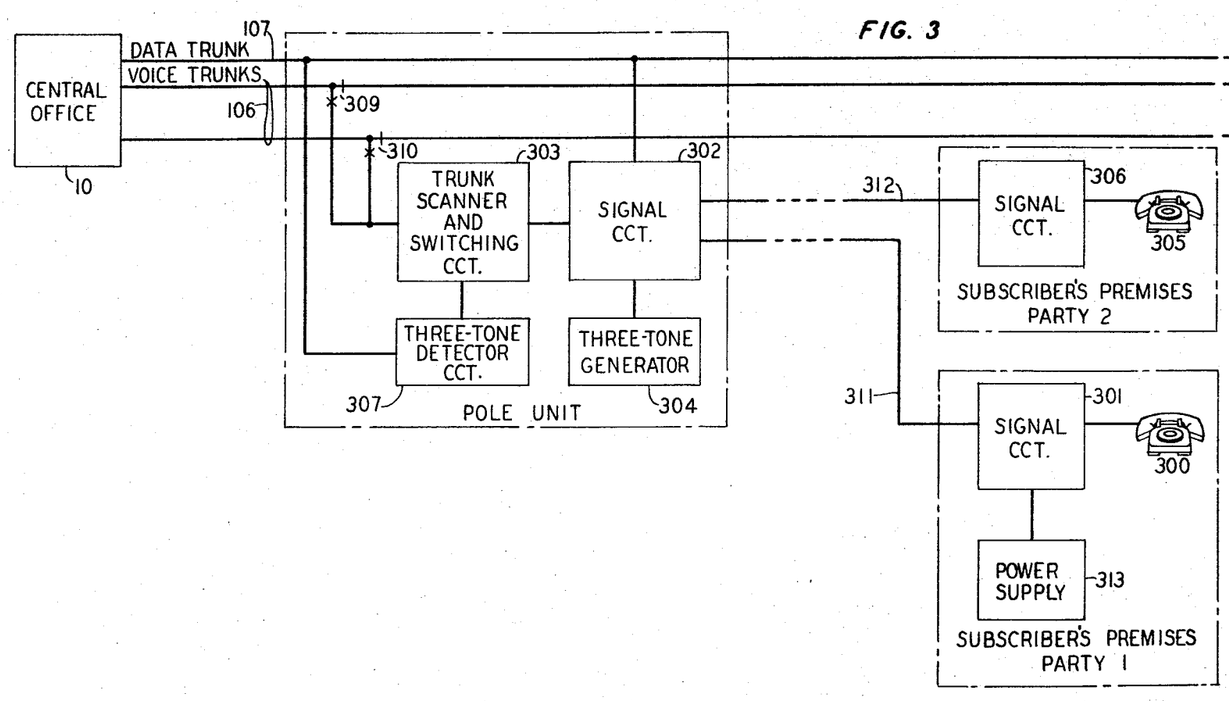
FIG. 3 shows in general form the equipment at a pole unit serving party line customers in which three-frequency signaling is used.

General description of operation—Two-party service—Three-frequency—Originating call Referring to FIG. 3, an originating call by a party line customer at substation 300 is initiated by an off-hook condition in a manner similar to that described above. Thus, an off-hook condition at substation 300 energizes signal circuit 301 to deliver a signal via circuit 302 to the trunk scanner 303. Thereupon, the scanner is energized and sizes an idle one of the voice trunks 106. At this time a signal is applied over the ring conductor of the selected trunk to the central office 10 indicative of a service request and a selected two tones from the three tone generator 304 are transmitted over the selected trunk to the office. The office detects the service requests and identifies the substation originating the call. Moreover, the office applies a signal over the tip conductor of the selected trunk and delivers dial tone to the calling substation. An originating connection at substation 305 is effected in a similar manner over signal circuit 306 with the exception that a distinct two tones from the three tone generator 304 uniquely representative of substation 305 are utilized.

General description of operation—Two-party—Three-frequency—Terminating call

The procedure for this type of call is similar to that for a private line call as described above. Thus, the central office will identify the substation to be called and will transmit the appropriate two tones unique to the called substation to the three tone detector circuit 307. The latter will identify which of the substations 300 or 305 is to receive the call and temporarily disconnect the substation which is not called in order to prevent ringing at that substation. Thereafter, and in response to the detection of the two tones applied by the office, the trunk scanner 303 is energized and a signal is delivered over the ring conductor of the selected trunk to the office. Moreover, the appropriate two tones unique to the called party line substation are delivered by generator 304 over the selected trunk. The office makes a comparison of the two tones which are transmitted over data trunk 107 with the two tones which are received on the selected voice trunk and, if a match check occurs, delivers a ringing signal to the called substation. When the customer responds, ringing is tripped in a conventional manner and the office removes the two tones being transmitted over the data trunk 107. Removal of the tones from the data trunk reconnects the substation which is not being called.

General description of operation—Two-party—Three-frequency—revertive call

If substation 300 initiates a calling connection to substation 305 of FIG. 3, the initial procedure is similar to that described above for a private line originating call. Thus, substation 300 is connected to the central office via scanner 303 and a selected voice trunk in the group 106. When the office receives the called directory number, equipment therein recognizes the revertive calling condition, and signals indicative of the called substation are delivered over the data trunk to the pole unit. In response thereto substation 300 is temporarily disconnected and a ringing signal may be applied to substation 305. When an answer condition is detected at substation 305 by signal circuit 306, the central office effects the release of the selected voice trunk from trunk scanner 303 by the release of contacts 309, 310, etc. The conversation connection may thereupon continue over the local path including the customer loop wires 311, 312 to substations 300 and 305 and the pole unit. It will be noted that power is supplied locally by the power supply 313 at the premises at which substation 300 is located. Subsequent hang up signals by either or both parties will not be detected at the office.

If a call is received by the office for either of the substations 300 or 305 while the latter is engaged in the revertive connection, the appropriate multifrequency tones indicative of the called substation are applied to the data trunk. Thereupon, a signal is returned over the tip conductor of the data trunk by the pole unit indicating that the substation is busy.

General description of operation—Two-party—Two-frequency—Originating call

Figure 4:
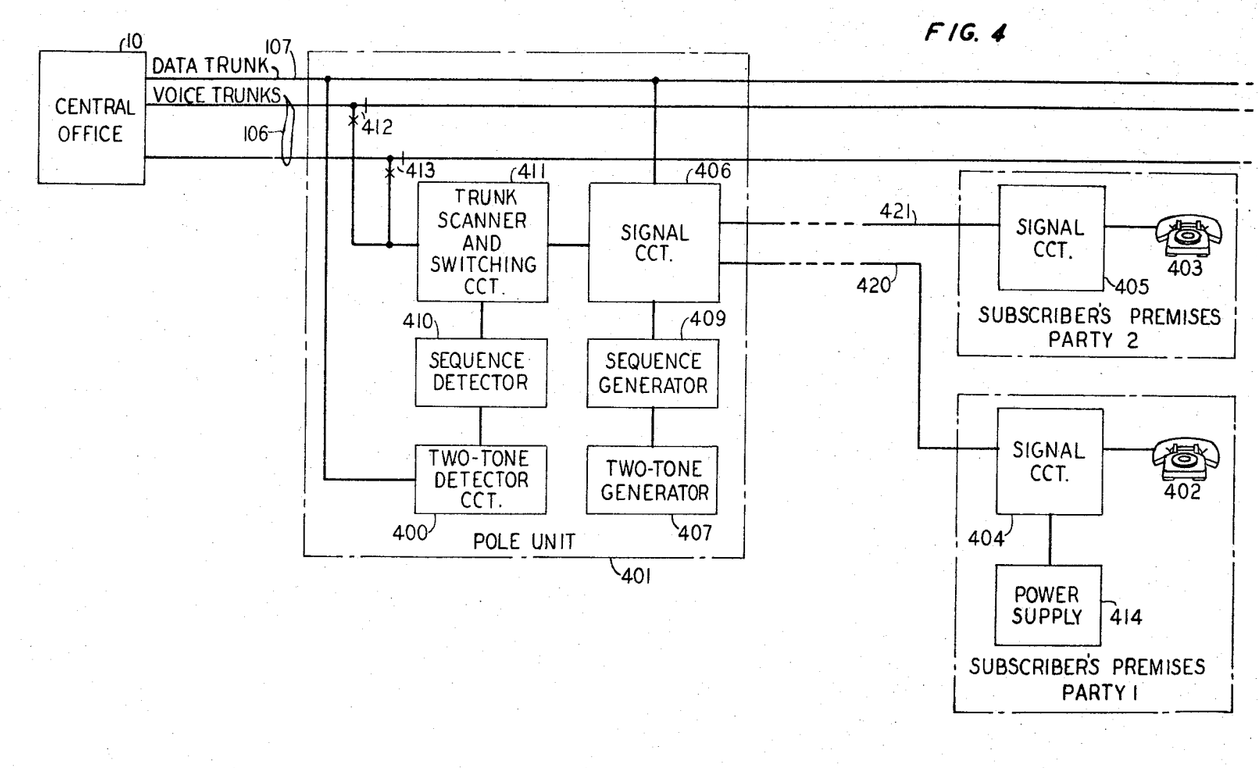
FIG. 4 shows a pole unit serving party line customers in which sequential two-frequency signaling is used.

Referring now to FIG. 4, a central office 10 is shown connected over a data trunk 107 and a group of voice trunks 106 to the pole unit 401 which serves both party lines 402 and 403. Each of the substations 402 and 403 is connected over signal circuitry 404 and 405 to receiving and repeating equipment, signal circuit 406, at the pole unit. The latter is shown in detail in FIGS. 9 and 10. A single two tone generator 407 and two tone detector 400 is utilized to service both substations 402 and 403. The sequence in which the tone signals are transmitted to the office and received from the office is determined by sequence generator 409 and sequence detector 410, both of which are shown in detail in FIG. 10.

Assuming, for example, that the customer at substation 402 goes off-hook, the signal circuit 404 delivers a signal to the pole unit 401 over signal circuit 406. The trunk scanner 411 is energized and seizes the first idle trunk. A signal condition is applied to the ring conductor of the selected trunk and generator 407 delivers a coded sequence indicative of the calling party identification. For example, the tone signals may include both tones sent simultaneously for a predetermined period followed by one of the tones being transmitted alone for a predetermined period. Equipment at the office detects the service request and identifies the calling substation. Thereupon, the office applies a signal to the tip conductor of the selected trunk to indicate that the substation has been identified. Subsequently, dial tone is applied to the selected trunk and the calling customer dials the directory number of the called substation. The call is thereupon extended in a routine manner.

When a disconnect signal is received at the office, the calling substation is disconnected from the trunk at the pole unit by signals from the office which effect the release of contacts 412, 413, etc.

General description of operation—Two-party—Two-frequency—Terminating call

In response to the called directory number, the central office identifies the customer substation and transmits sequentially coded tones unique to the called substation on data trunk 107 in FIG. 4. At the appropriate pole unit the tones are detected in detector circuit 400 and the particular party substation 402 or 403 which is to receive the call is determined. If the call is intended for substation 402, substation 403 is temporarily disconnected in order to prevent ringing at that substation.

In response to the detection of the sequential tones applied by the office, trunk scanner 411 is energized and a signal is delivered over the ring conductor of the selected trunk to the office. In addition, the two tone generator 407 is energized to apply the same sequence of tones indicative of substation 402 to the selected voice trunk over sequence generator 409. The office equipment thereupon makes a comparison of the sequential tones which are transmitted over the data trunk 107 with the sequential tones returned from generators 407 and 409 via the selected voice trunk; and if a match check occurs, a ringing signal is delivered to the called substation 402. When substation 402 answers, ringing is tripped by conventional methods and substation 403 is reconnected.

General description of operation—Two-party—Two-frequency—Revertive call

Assuming for illustrative purposes that the customer at substation 402 is initiating a revertive calling connection to the party line customer at substation 403, an off-hook condition at substation 402 initiates an originating calling connection in the manner described above for an originating call. When the office receives the dialed directory number, equipment thereat recognizes that a revertive call is in effect. Moreover, the coded sequence of tones indicative of substation 403 is applied to the data trunk by the central office. At this time, substation 402 is temporarily disconnected and ringing potential is applied to the selected trunk and substation 403 may answer by going off-hook. This condition is signaled to the central office which removes a potential from the tip conductor of the selected trunk to release the connection at the pole unit between the trunk scanner and the previously selected trunk. At this time no voice trunk is connected between the pole unit and the office, but both parties may continue to converse over their respective connections 420, 421 to the pole unit. It will be noted that local power supply 414 at the subscriber's premises of party 1 provides talking battery.

If an incoming call is received by the central office for substations 402 or 403, while the latter are engaged in the revertive calling connection, the sequential tones indicative of the called party are transmitted over the data trunk. If a revertive call is in progress, a voltage will be applied to the tip conductor of the data trunk to signify to the office that a revertive call is in effect, i.e., the called party is busy.

Detailed description—Originating call

Figure 5:
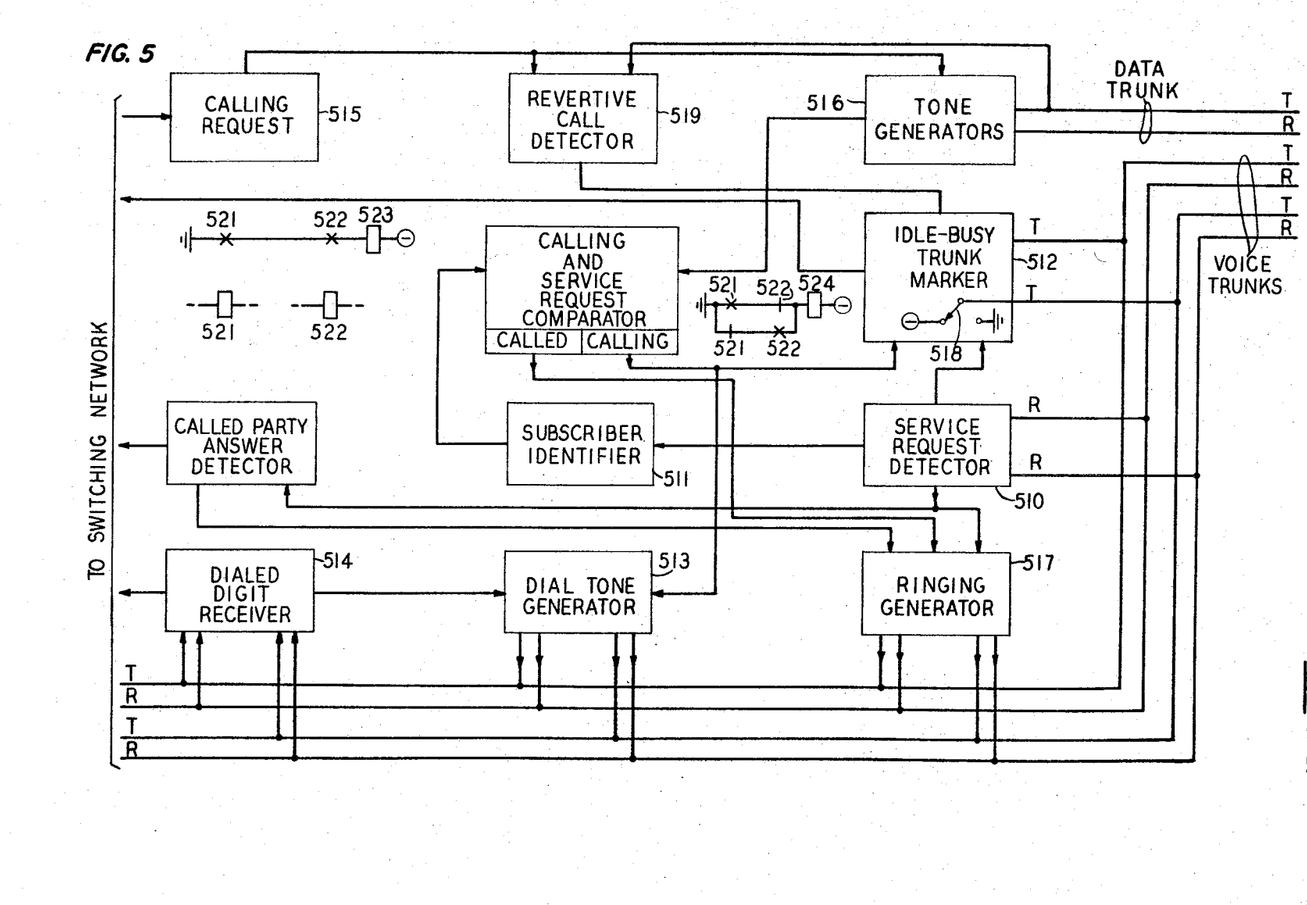
FIG. 5 shows the equipment utilized at the central office location in conjunction with the distributed concentrator units.
Figure 6:
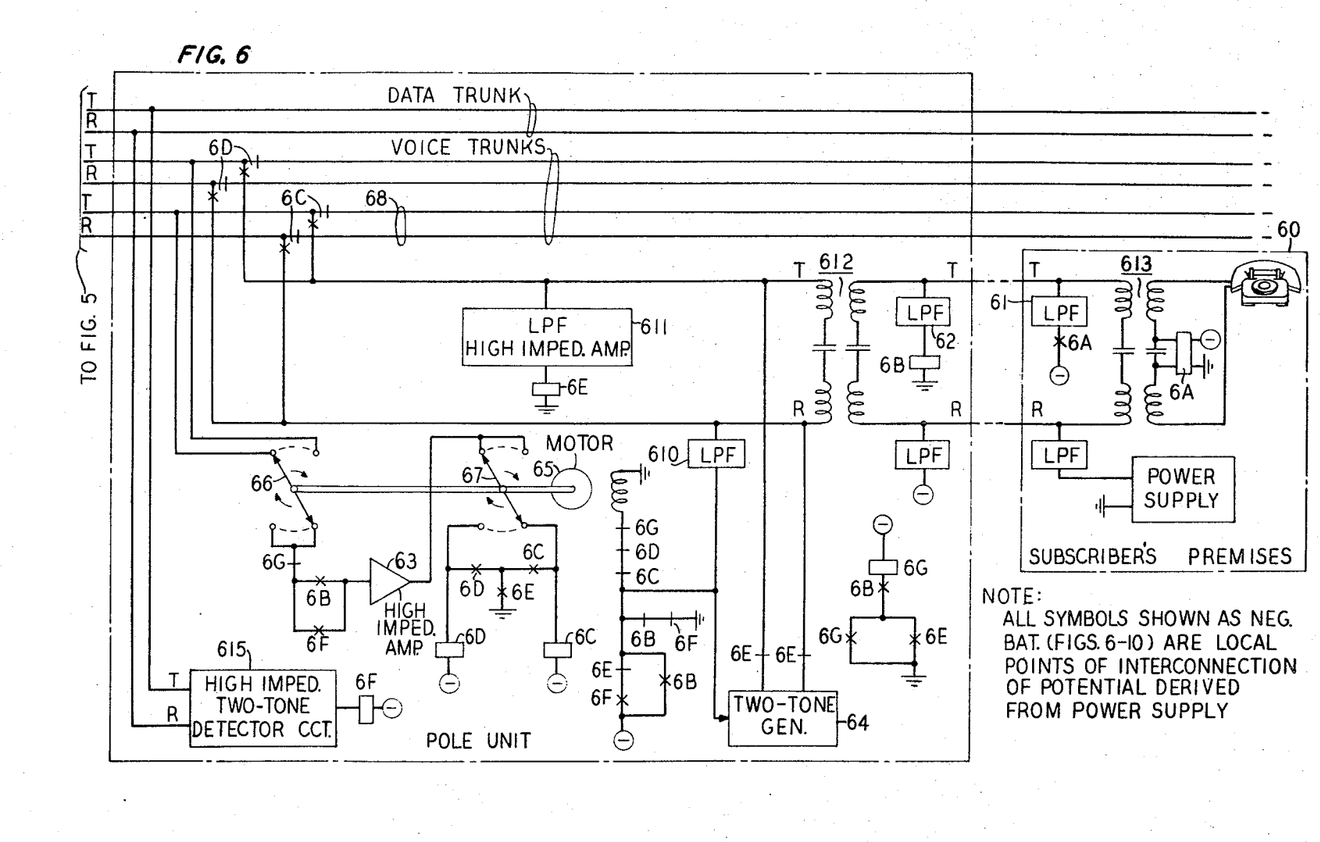
FIG. 6 shows the details of a pole unit arranged to serve a private line customer.

Referring now to FIGS. 5 and 6, when a customer at substation 60 goes off-hook, relay 6A is operated over an obvious path including the switch hook contacts at substation 60. The contacts of relay 6A close a path for the operation of relay 6B which may be traced from negative battery, contacts of relay 6A, filter 61, conductor T, filter 62, winding of relay 6B to ground. The filters are low-pass filters which permit independent DC signaling on the tip and ring without substantially interfering with subsequent voice frequencies. The operation of relay 6B connects high impedance amplifier 63 to the trunk scanner circuit and also energizes the multifrequency 2-tone generator 64. The latter path may be traced from negative battery, contacts of relay 6B, to the input to generator 64. The scanner motor 65 is energized over a similar path including the contacts of relays 6C, 6D, 6G, winding of motor 65 to ground. With the motor energized, the trunks are scanned for an idle condition represented by a ground on the tip lead of the trunk. The first trunk with a ground condition on the tip lead extends a path over selector arm 66, contacts of relay 6G, 6B, amplifier 63, selector arm 67, winding of relay 6C (assuming trunk 68 is first) to negative battery. The operation of relay 6C interrupts the scanner motor at the contacts of relay 6C and closes a path from trunk 68, contacts of relay 6C to the tip and ring conductors T and R extending to the substation 60.

In the central office, seizure of the trunk 68 is detected by the application of a voltage to the ring conductor over a path which may be traced from negative battery, contacts of relay 6B, filter 610, contacts of relay 6C, to the ring conductor R of trunk 68. The path may be further traced to the service request detector 510 at the central office. Thereupon the central office identifies the calling substation by examining the multifrequency tone transmitted from generator 64 over the tip and ring conductors of trunk 68. When the identification is effected by identifier 511, the office will apply a voltage to the tip lead of the trunk at marker 512 to operate relay 6E over amplifier 611. Operation of relay 6E disconnects generator 64 from the tip and ring conductors of the trunk as well as providing a locking path for relay 6C and an operating path for relay 6G. Operation of relay 6G disconnects amplifier 63 and the scanning motor thereby preventing substation 60 from seizing an idle trunk if the called party disconnects first. The central office now transmits dial tone from generator 513 over trunk 68 and the signal is extended over the contacts of relay 6C, conductors T and R in parallel, transformer coupling 612, additional conductors T and R in parallel, transformer coupling 613 to substation 60. Thereupon, the customer at substation 60 may dial the called directory number and the digits are received in a conventional manner in receiver 514. It will be noted that relays 6A and 6B respond to dial pulses by alternately applying a voltage or ground signal on lead R of the trunk at the contacts of relay 6B. The connection is thereupon extended in a routine manner.

Upon completion of conversation, if the calling party hangs up first, relay 6A is released in turn releasing relay 6B. The latter releases relay 6G, disconnects the high impedance amplifier 63 and removes voltage from the ring lead to indicate hang up. In respond to this signal at the office, voltage is removed from the tip lead and ground is replaced thereon as shown symbolically by switch 518.

When the voltage is removed from tip conductor T relay 6E is released and the holding path for relay 6C is opened.

Hang-up by the called party is detected at the central office conventionally and voltage is removed from the trunk tip conductor as explained. Relay 6E is released and the remote unit is restored to a stand-by condition.

The high impedance amplifiers 63, 611, etc., are useful in preventing excessive loading on a trunk line where many detectors are connected in parallel to the trunk. Also they reduce interference with conversations in progress when a busy trunk is scanned.

Detailed description—Terminating call

Referring again to FIGS. 5 and 6, at the central office, a calling request is delivered through circuit 515 to energize selected multifrequency generators in circuit 516. The latter may include apparatus similar to that described and referred to in Patent 2,820,103 of H. H. Abbott of Jan. 14, 1958, which is herewith incorporated by reference together with the patents therein referred to. When the two tones unique to the called customer are detected at the appropriate pole unit by detector circuit 615, relay 6F is operated. The detector circuit may also be similar to that described in the H. H. Abbott patent. Thereupon the high impedance amplifier 63 is connected into the circuit and the scanner motor is started over the contacts of relay 6F and a path similar to that described above for a service call. Moreover, the two tone generator 64 is energized by a voltage applied over the contacts of relay 6F. The trunks are scanned in the manner described above for a service request call and again the first idle trunk is seized.

Assuming that trunk 68 is the first idle trunk, the trunk seizure is recognized by the application of a voltage on the trunk ring lead applied over the contacts of relays 6F, 6E, filter 610, contacts of relay 6C to the ring conductor R and detector 510. At the office the trunk seizure is recognized in detector 510 and the office identifies the subscriber identifier 511 in accordance with the signals transmitted by generator 64. The two tones thus received are compared with the two tones transmitted on the data trunk. This procedure is shown symbolically by the operation of relay 521 in response to the reception of signals from generator 64 and the operation of relay 522 in response to the reception of identical signals from tone generators 516. Operation relays 521 and 522 results in the operation of relay 523. If they are different as shown symbolically by the operator of relay 524, the call is treated as a new request for service.

If they are the same, the office recognizes the answer from the called substation and voltage is applied on the trunk tip lead. Moreover, ringing current is applied from generator 517. Relay 6E operates in the manner described above for a service request call in response to the voltage on the tip conductor. Thereafter, when the subscriber at substation 60 lifts his receiver, relay 6A is operated in turn causing the operation of relay 6B. Operation of the latter relay applies a voltage to the ring conductor R of trunk 68 over the contacts of relay 6B and filter 610 to indicate an answer by the called party.

Hangup is detected at the central office which then removes the battery potential from the tip of the conductor of the trunk thereby releasing relay 6E. The release of relay 6E disconnects the customer from the trunk and restores the pole unit to the standby condition.

*Detailed description—Service request call (Two-party, three-frequency)*

Figure 7:
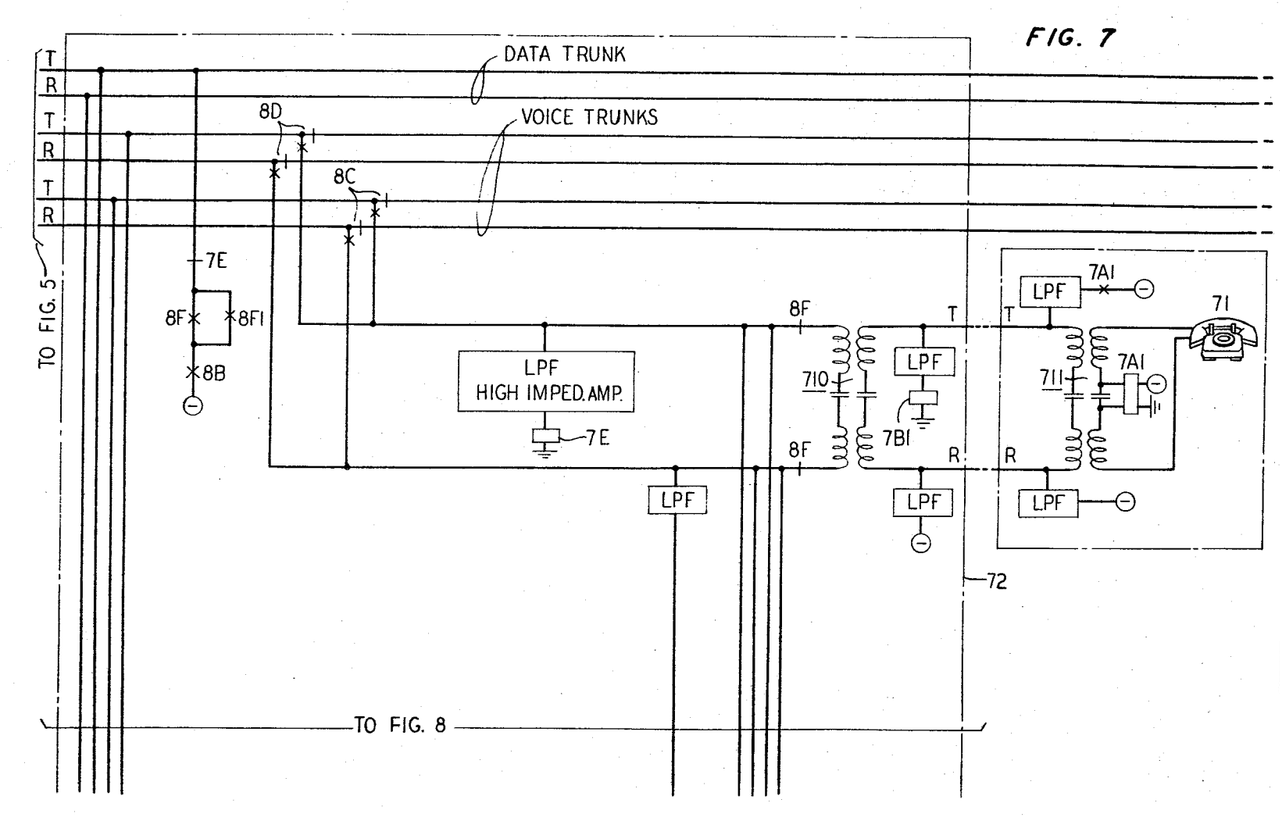
FIGS. 7 and 8 show the details of a pole unit arranged to serve party lines utilizing three-frequency signaling.
Figure 8:
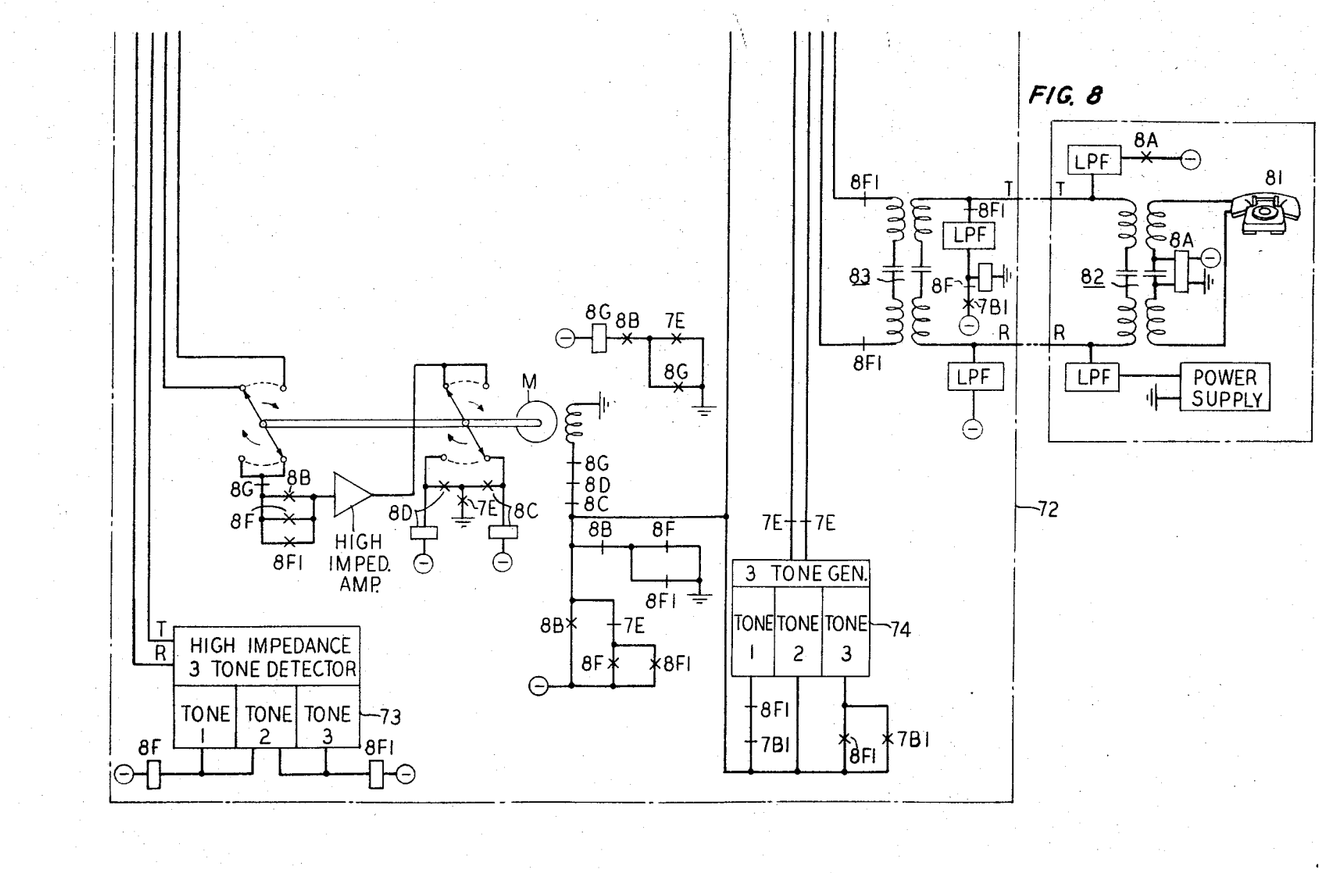

Referring now to FIGS. 5, 7 and 8, it is seen that each of the substations 71 and 81 are coupled to a single pole unit 72. A three tone detector 73 and a three tone generator 74 are utilized to serve both parties. In this arrangement each of the parties is identified by two simultaneous frequencies. For example, tone 1 and tone 2 are utilized to uniquely identify substation 71 and tone 2 and tone 3 to identify substation 81.

Assuming that substation 81 is initiating a service request call, the procedure is identical to that described above for a service request call on a private line with correspondingly letter designated relays performing corresponding functions (e.g., relays 6E and 7E, relays 6C and 8C, relays 6D and 8D etc.).

The procedure for substation 71 differs in that an off-hook condition will cause the operation of relay 7A1 and place a voltage on the tip conductor of the drop wire. This voltage will operate relay 7B1 at the pole unit which in turn operates relay 8B. The operation of relay 7B1 also couples tone generators for tones two and three to the line instead of those previously used.

*Detailed description—Terminating call (Two-party, three-frequency)*

Referring now to FIGS. 5, 7 and 8, a call is extended from the central office in the manner described above generally for a terminating call to a private line customer. Thus the calling request circuit 515 would energize specific multifrequency generators in circuit 516 unique to the called customer. Here, too, the tones are placed on the data trunk at the central office. Detector 73 is responsive to the multifrequency tones to operate relay 8F or 8F1. Assuming that the called customer is at substation 71, relay 8F1 will be operated in response to the transmission of multifrequency tones two and three. It is apparent from FIG. 8 that the contacts of relay 8F1 open the transmission path to substation 81 in order that ringing may be heard only by the party to be called. Signaling between the central office and the pole unit is similar to that described above for private line service. Moreover, the scanning and seizure of a trunk, in this instance, over the contacts of relay 8F1 is similar to that described above for a terminating call to a private line customer.

*Detailed description—Revertive call (Two-party, three-frequency)*

It will be assumed for purposes of illustration that the customer at substation 71 is initiating a call to the customer at substation 81. An off-hook condition at substation 71 causes the operation of relay 7A1 and in turn the operation of relays 7B1 and 8B with the scanning for and seizure of an idle trunk in a manner similar to that described above for a service request call by substation 71. When the office receives the dialed digits indicative of the called substation revertive call, detector 519 recognizes that a revertive call is in effect. Detector 519 may, for example, be of the type disclosed in Patent 2,585,904 of A. J. Busch of Feb. 19, 1952. The two frequencies unique to called substation 81 are applied to the data trunk. In response thereto relay 8F is operated at the pole unit to temporarily disconnect substation 71 from the trunk. When the office detects the change in potential on the trunk ring conductor from voltage to ground, ringing is applied to the trunk. This ringing potential is heard by substation 81. An off-hook condition at substation 81 causes the operation of relay 8A and in turn the operation of relay 8B. The latter places a voltage on the ring conductor of the trunk which is detected by the office and voltage is removed from the tip conductor of the trunk to release relay 7E at the pole unit. The latter causes the release of relay 8C or 8D used to connect the substation to the trunk. Both parties may thereafter converse over the local connection without utilizing a trunk. This path may be traced in FIG. 8 from substation 81, transformer coupling 82, transformer coupling 83, contacts of relay 8F1, contacts of relay 8F, transformer coupling 710, transformer coupling 711 to substation 71.

Subsequently, however, hangup by either or both parties is obviously not detected at the central office. If an incoming call is received for substation 71, while a revertive call is in effect, the two tones for substation 71 are transmitted on the data trunk in the usual manner; and if a revertive call is in effect, a path may be traced in FIG. 7 from negative battery, contacts of relay 8B, contacts of relays 8F1, 7E to the tip conductor of the trunk. This signal is indicative of the continuance of a revertive call and the calling customer receives a busy indication.

*Detailed description—Service request call (Two-party, two-frequency)*

Figure 9:
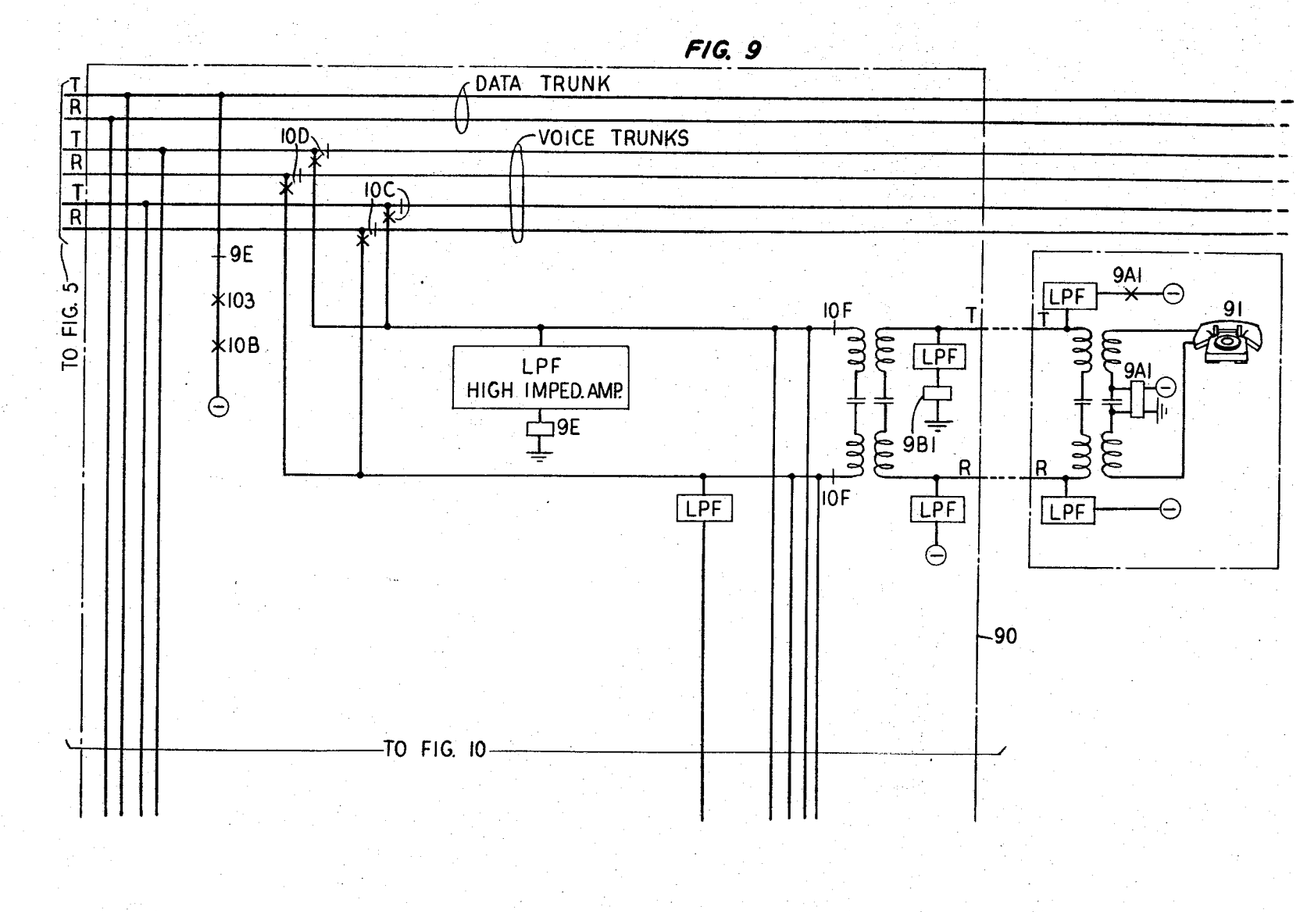
FIGS. 9 and 10 show the details of a pole unit arranged to serve party lines utilizing sequential two-frequency signaling.
Figure 10:
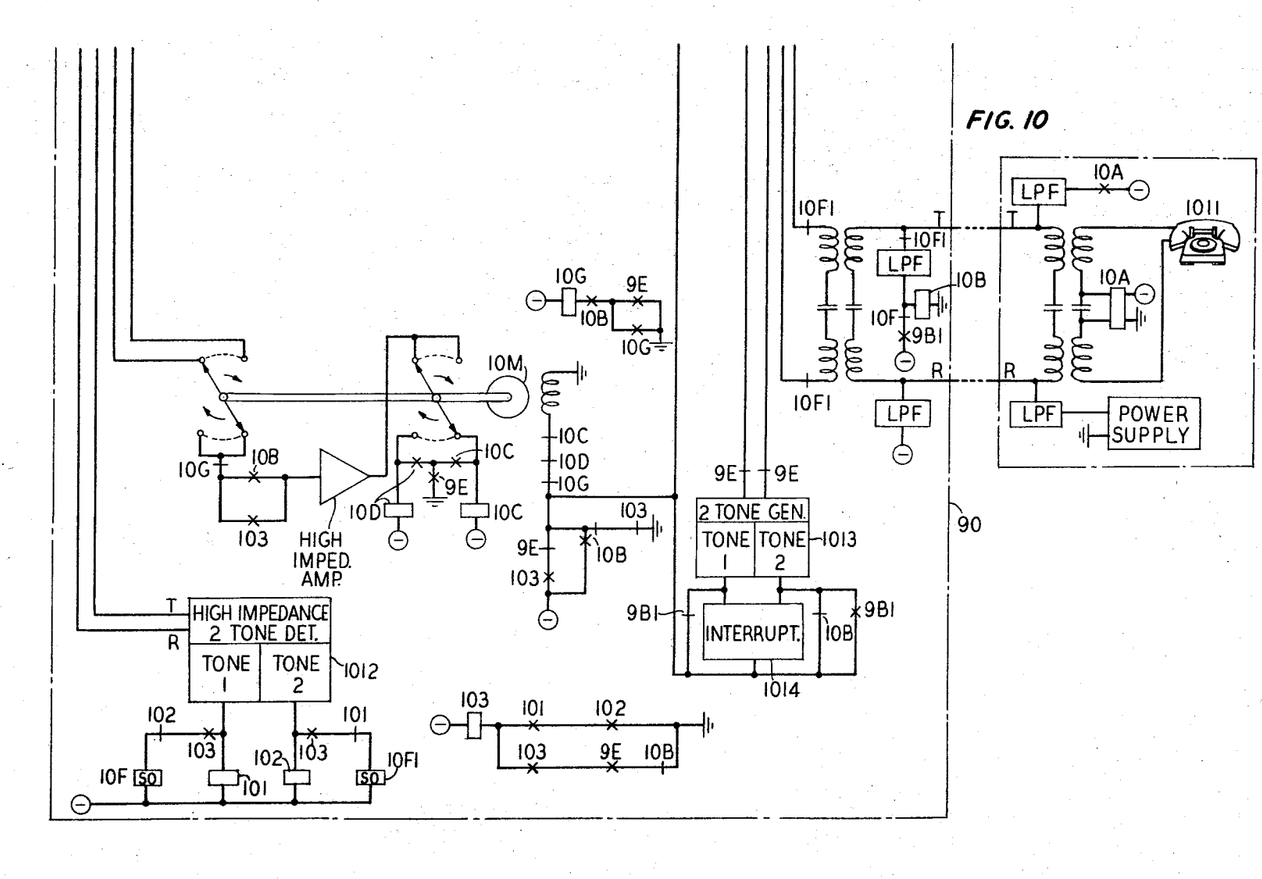

Referring now to FIGS. 5, 9 and 10, it is seen that the pole unit 90 serves substations 91 and 1011. In this arrangement the pole unit is provided with tone detector 1012 and tone generator 1013. Since only two tones are used, differentiation between the parties is effected by a sequential tone code. Illustratively, substation 91 will be identified by the simultaneous reception of tones one and two for a predetermined period followed by the transmission of tone one alone for a predetermined period. For substation 1011 the subsequent single tone would be tone two.

It will be assumed for purposes of illustration that the customer at substation 1011 is initiating a call. In response to the off-hook condition, relay 10A is operated and in turn causes the operation of relay 10B. The contacts of relay 10B provide a path for the energization of the scanner motor 10M and also energizes the tone generator 1013 and interrupter 1014. The contacts of relay 10B also open a bypass circuit for interrupter 1014. The tone generator 1013 thereupon delivers two tones over the contacts of relay 9E to the selected trunk conductors. Under these conditions the contacts of relay 9B1 provide a continuous actuation of the tone one element of generator 1013 whereas the interrupter cyclically energizes the tone two element. In this manner the frequencies which appear on the selected trunk are alternately, tones one and two followed by tone one alone.

At the office, seizure of the trunk is detected in the manner described above by the application of a potential on the ring conductor over the contacts of relay 10B and the contacts of relay 10C or 10D associated with the selected trunk. In response to the sequential tone code the office identifier 511 ascertains the identity of the calling line. Subsequent action in the call is similar to that described above for a service request call by a private line customer.

If in this instance, substation 91 had initiated the call, the over-all operation would be identical to that described above with the exception that relay 9B1 would have been operated in response to the operation of relay 9A1. Moreover, the contacts of relay 9B1 would have bypassed the interrupter 1014 in a manner adapted to generate tones one and two followed by tone two alone.

*Detailed description—Terminating Call (Two-part, two-frequency)*

Assuming that the call is directed to substation 91, the central office calling request circuit 515 energizes tone generator circuit 516 to deliver the sequential code tone unique to substation 91 on the data trunk. Tone detector 1012 responds initially to the simultaneous reception of tones one and two by operating relays 101 and 102. Thereupon relay 103 is operated to couple relays 10F and 10F1 to the tone detector 1012. The latter relays 10F and 10F1 are slow-to-operate relays. The contacts of relay 103 energize scanner motor 10M and apply voltage to the ring conductor of the selected trunk. Moreover, tone generator 1013 is activated. An idle trunk is scanned and seized in the manner described above. The central office responds to the voltage on the trunk ring lead and detects the simultaneous reception of tones one and two indicating that the pole unit has selected a trunk. Thereafter the application of a voltage to the tip lead of the trunk energizes relay 9E which locks up relay 10C or 10D associated with the selected trunk. Moreover, tone generator 1013 is disconnected at the contacts of relay 9E and voltage on the ring conductor is removed. Thereafter ringing current is applied to the trunk at the same time that the sequential code tones are applied to the data trunk. Since substation 91 is being called, relay 10F1 will be operated, thereby disconnecting substation 1011 from the ringing potential. The answer condition is detected at the central office by the application of a voltage to the ring conductor of the trunk over the contacts of relay 10B which is actuated in response to operation of relays 9A1 and 9B1. The procedure on hangup is simliar to that described above for a terminating call to a private line customer.

*Detailed description—Revertive call (Two-party, two-frequency)*

Assuming for purposes of illustration that the customer at substation 1011 is calling the customer at substation 91, the off-hook condition at substation 1011 operates relay 10A and in turn 10B and the call is thereupon extended to the office in the manner described above for a service request call. When the office receives the called line number, it is recognized by detector 519 that a revertive call is in effect and sequential signals unique to substation 91 are applied to the data trunk. Detector 1012 is energized in the manner described above for a terminating call. Thereafter, the operations are also similar to that described above for a terminating call and an off-hook condition at substation 91, indicating an answer condition, causes the operation of relays 9A1, 9B1 and 10B which in turn places a voltage on the ring conductor of the selected trunk. The office thereupon removes voltage from the tip lead of the trunk to release relay 9E which in turn releases relays 10C or 10D associated with the selector trunk. Substations 91 and 1011 may thereupon continue in conversation without utilizing a trunk to the office. Under these conditions an attempt to extend a terminating call to either substation 91 or 1011 is treated in the manner described above for a revertive call. Moreover, a hangup condition by either or both parties is not detected at the office.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator system including a plurality of remote substation lines, a telephone central office, a lesser plurality of trunks extending from said office, means effective in response to a terminating call to a called one of said lines for transmitting signals over one of said trunks uniquely identifying the called one of said lines, remote switching means disposed proximate to said called line responsive to the reception of said signals for connecting said called line to a selected one of said trunks, means thereafter actuated for returning signals over said selected trunk to said office, and means at said office responsive to the receipt of the returned signals for completing said call to said called line over said selected trunk.

2. A telephone line concentrator system including a plurality of remote substation lines, a telephone central office, a lesser plurality of trunks extending from said office, individual remote switching means proximate to said lines, said remote switching means including selector means for connecting said lines to idle ones of said trunks, signaling means and receiving means at said remote switching means, means effective in response to a terminating call to a called one of said lines for transmitting signals over one of said trunks uniquely identifying the called one of said lines to said receiving means individual to said called line, means at said remote switching means for energizing said signaling means individual to said called line to return signals over said trunk uniquely identifying said called line, and means at said office for comparing said signals transmitted over said trunk to said called line with said signals returned from said signaling means preparatory to completing the connection.

3. A distributed line concentrator system including a plurality of remote substation lines, a telephone central office, a plurality of voice trunks and a data trunk extending from said office, means effective in response to a terminating call to a called one of said lines for transmitting signals indicative of the identity of the called one of said lines over said data trunk, receiving means disposed proximate to said called line for detecting said signals, remote switching means subsequently actuated for seizing an idle one of said voice trunks and including means for transmitting coded signals over said seized trunk indicative of the identity of said called line, means at said office responsive to the reception of said coded signals for comparing said signals transmitted on said data trunk with said coded signals, and means at said office effective in response to a match between said compared signals for completing said terminating call over said seized trunk to said called line.

4. A distributed line concentrator system in accordance with claim 3 including in addition means at said office effective in response to a mismatch between said compared signals for controlling the establishment of an originating connection to said called line.

5. A telephone line concentrator system including a plurality of remote substation lines, a telephone central office, a plurality of voice and data trunks extending from said office, remote switching means individually disposed proximate to said lines for coupling said lines to said trunks, said remote switching means including means for coupling party lines to said trunks, means at said office responsive to a terminating calling condition to one of said party lines connected to a particular remote switching means for extending a connection over a selected one of said voice trunks to said particular remote switching means, and additional means at said remote switching means for temporarily disconnecting all but the called party line from said remote switching means preparatory to ringing said called party line.

6. A telephone line concentrator system including a plurality of remote lines including party lines having substations connected thereto, a telephone central office, a plurality of voice and data trunks extending from said office, remote switching means individually disposed proximate to said lines for coupling said lines to said trunks, said remote switching means including means for coupling at least two of said party lines to said trunks, means at said office responsive to a calling condition at one of said party line substations indicative of a revertive calling connection to another of said party line substations connected to the same remote switching means for extending a connection over a selected one of said voice trunks to said remote switching means connectable to said calling and called party line substations, said means at said office for extending said connection including means for transmitting coded signals indicative of said calling and called party line substations, and means at said remote switching means for subsequently disconnecting said substations from said trunk and for continuing said connection between said calling and called substations over said remote switching means.

7. A telephone line concentrator system in accordance with claim 6 wherein said means at said remote switching means for effecting a local connection includes means for terminating said revertive connection exclusive of the transmission of any supervisory signals to said office.

8. A telephone line concentrator system in accordance with claim 6 including in addition means effective in response to a subsequent terminating calling condition to one of said party line substations engaged in said revertive connection for transmitting signals over said data trunk indicative of said called party line identification, and means at said remote switching means for transmitting a return signal over said data trunk to said office indicative of a busy condition at said called party line substation.

9. A telephone line concentrator system including a plurality of remote lines having substations connected thereto, a telephone central office, a lesser plurality of voice trunks extending from said office, a data trunk extending from said office, individual remote switching means disposed proximate to said lines for connecting said lines to said trunks, means effective in response to an off-hook condition at one of said substations for selecting an idle one of said voice trunks, additional means for transmitting coded signals over said voice trunk to said office, means at said office for acknowledging said coded signals by applying a signal to said data trunk, and means at said office effective in response to a hangup indication at said substation for applying a supervisory signal to said voice trunk and including means subsequently activated for restoring said voice trunk to an idle condition.

10. A telephone line concentrator system in accordance with claim 9 wherein said means for transmitting signals to said office over said voice trunk includes means for transmitting simultaneous multifrequency signals indicative of the identification of said calling substation line.

11. A telephone line concentrator system in accordance with claim 9 wherein said means for transmitting signals over said selected trunk to said office includes means for transmitting sequential multifrequency and simultaneous multifrequency signals indicative of the identification of said calling line substation.

12. A distributed line concentrator system including a plurality of remote substation lines, a telephone central office, a lesser plurality of voice trunks extending from said office, a data trunk extending from said office, individual remote switching means disposed proximate to said lines for connecting said lines to said voice trunks, means at said office effective in response to a terminating calling condition to one of said remote substation lines for transmitting signals indicative of the called line identification over said data trunk, means at said remote switching means individual to said called substation line effective in response to said signals for selecting an idle voice trunk to said office, additional means at said remote switching means for transmitting signals indicative of said called substation over said selected voice trunk to said office, and means at said office for comparing said signal transmitted over said data trunk and said signal received over said voice trunk.

References Cited

UNITED STATES PATENTS

| | | | |
|---|---|---|---|
| 3,070,666 | 12/1962 | Brooks et al. | 179—18 |
| 3,250,859 | 5/1966 | Fisher | 179—18 |

WILLIAM C. COOPER, *Primary Examiner.*

A. H. GESS, *Assistant Examiner.*

U.S. Cl. X.R.

179—17